UNITED STATES PATENT OFFICE.

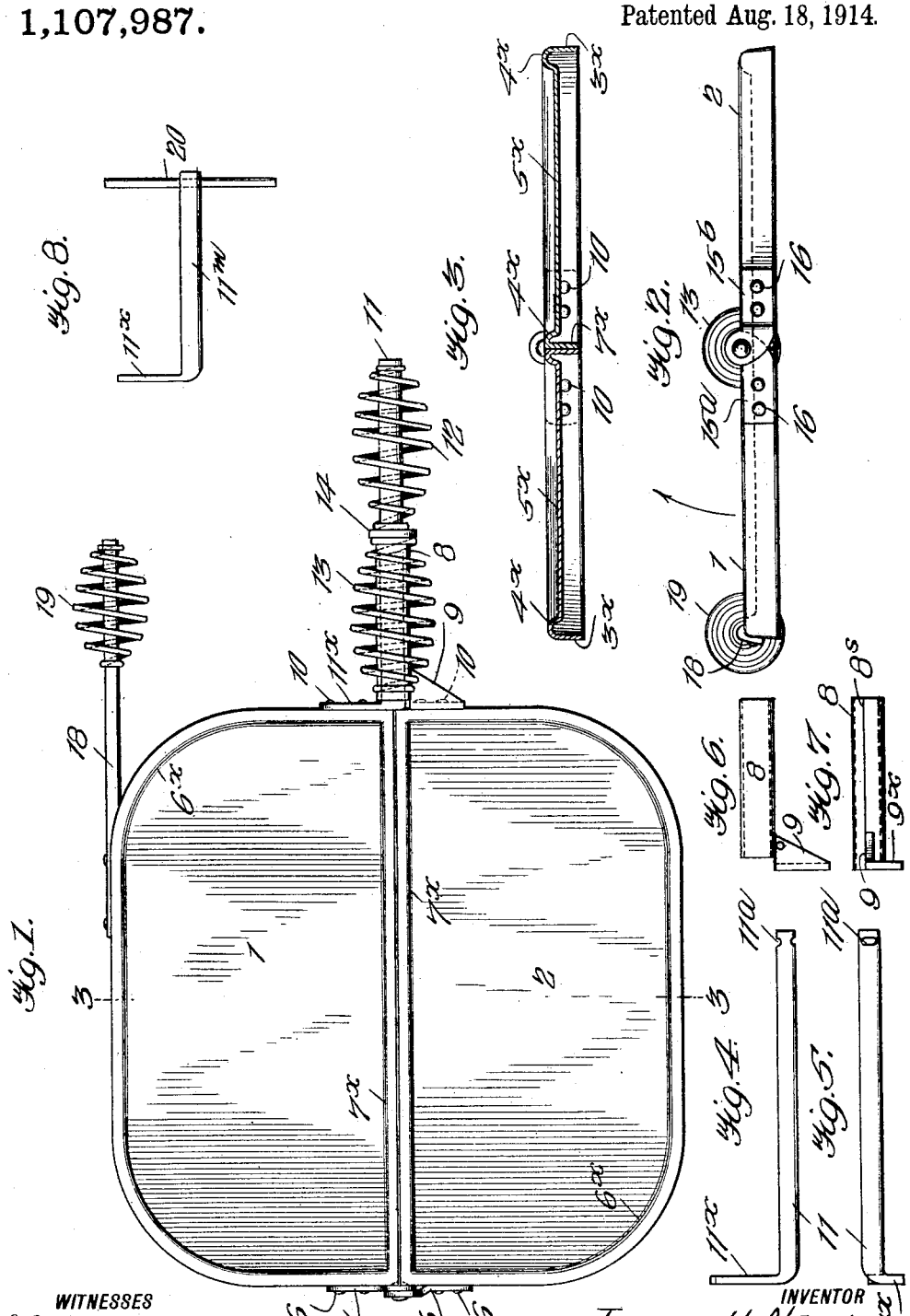

THOMAS J. NASH, OF LINCOLN, NEBRASKA.

GRIDDLE.

1,107,987.  Specification of Letters Patent. Patented Aug. 18, 1914.

Application filed August 13, 1913. Serial No. 784,517.

*To all whom it may concern:*

Be it known that I, THOMAS J. NASH, a citizen of the United States, and a resident of Lincoln, in the county of Lancaster and State of Nebraska, have invented a new and Improved Griddle, of which the following is a specification.

My invention relates to improvements in griddles, and it consists in the combinations, construction and arrangement hereinafter described and claimed.

An object of my invention is to provide a folding griddle in which pancakes or the like may be easily turned from one side to the other.

A further object of my invention is to provide a device of the type described which is hinged along its center line and which is provided with handles for readily turning one of the sections so as to carry the article deposited upon it over the opposite section and to deposit it thereon.

A further object of my invention is to provide a griddle of simple and durable construction which is of relatively light weight.

Other objects and advantages will appear in the following specification, and the novel features of the invention will be particularly pointed out in the appended claims.

My invention is illustrated in the accompanying drawings forming a part of this application, and in which—

Figure 1 is a plan view of the device. Fig. 2 is an end view. Fig. 3 is a section through the device along the line 3—3 of Fig. 1. Fig. 4 is a plan view of one of the handle members. Fig. 5 is a view of the handle member shown in Fig. 4 when rotated at 90°. Fig. 6 is a plan view of another handle member. Fig. 7 is a view of the member shown in Fig. 6 when rotated at 90°, and, Fig. 8 is a view of a modified form of handle member.

In carrying out my invention I provide a pair of similar griddle sections 1 and 2. These sections may be either cast or stamped from sheet metal. In the drawings I have shown a griddle formed of light sheet metal stamped into shape. Each of the griddle sections is provided with a downwardly extending rim such as that shown at $3^x$ in Fig. 3. The upper surface of the griddle is formed with a bead or rim $4^x$, the body portion of the griddle being depressed as shown at $5^x$ to prevent the grease from running out and also to keep the articles which are being cooked, in position. Each of the sections is formed with outer rounded edges $6^x$ to conform with the shape of pancakes, while the inner edges are straight as shown at $7^x$ in Fig. 1, these straight edges abutting one another.

In Fig. 6 I have shown one of the handle members. It consists of a tubular portion 8 having a laterally extended flange 9, one end of which is bent downwardly as shown at $9^x$. This tubular handle member is preferably formed of a piece of sheet metal blanked out and rolled up into a tube, so as to bring the seam $8^s$ on a level with the top of the griddle sections. The tubular portion of the handle may be secured to the griddle section 2 by means of rivets 10 which pass through the flange $9^x$ into the edge of the member 2.

In Figs. 4 and 5 I have shown the inner handle portion 11. This is provided with a downwardly and laterally bent flange $11^x$ which is secured by means of rivets 10 to the edge of the griddle section 1, as shown in Fig. 1. The handle portion 11 is preferably solid and extends through the tubular handle portion 8, the latter forming a bearing for the handle member 11 and the two handle members constituting a hinge for this end of the griddle. One end of the handle portion 11 is provided with notches or grooves $11^a$ arranged to received the end of a coiled wire grip 12, which is securely fastened at this end to the handle by forcing the end of the coil into the grooves $11^a$. The tubular handle portion 8 is provided with a coiled wire grip 13 which is securely fastened to the handle portion 8. The adjacent ends of the wire grips 12 and 13 are separated by a washer 14 so that they will rotate freely.

The opposite ends of the griddle sections are joined together by a hinge composed of the hinge members $15^a$ and $15^b$, which are secured to the griddle sections 1 and 2, respectively, by means of rivets 16 or in any other suitable manner. As will be seen from the drawings, the hinge member 15$^b$ is offset at its end to overlap the hinge member 15$^a$. The axis of the inner handle member 11 and the center of the hinge members 15$^a$ and 15$^b$ are in alinement and are coincident with the top of the griddle sections 1 and 2, as shown in Figs. 2 and 3. Owing to this arrangement, the inner contiguous edges of the griddle sections are always close together even when one section is turned relatively to the other. On one of the sections as, for instance, the section 1, I secure an auxiliary handle 18 which is provided with a coiled wire grip 19.

From the foregoing description of the various parts of the device the operation thereof may be readily understood.

In baking pancakes the batter is deposited on the right hand section 1 of the griddle, and when the cakes are to be turned, the grip 12 of the inner handle member 11 is grasped and given an easy turn in a counterclockwise direction. The cakes are instantly, easily and perfectly turned and are deposited on the left hand griddle section 2 in the same relative position to that occupied on the section 1. The section 1 may be then turned back and batter for other cakes may be deposited thereon.

The auxiliary handle is provided for holding the griddle still while removing cakes that may stick to the griddle or for convenience in cleaning, and while I have shown it on the right hand section 1, it may be obviously placed on either section or on both without departing from the spirit of the invention. Moreover, the auxiliary handle facilitates the operation of larger griddles. The handles are long enough to project well out over the edge of the stove and are always cool.

In Fig. 8 I have shown a modified form of the inner handle in which handle portion 11$^m$ is shortened and is provided with a cross-bar 20 by means of which the handle may be manipulated.

It is obvious that other forms of handles than those shown might be made while still conforming to the spirit of the invention.

I claim:

1. In a griddle, a pair of similar griddle sections hinged together, a handle member for each of said sections, the axis of one of said handle members being in alinement with the top of the griddle and the other of said handle members surrounding a portion of and forming a bearing for the first mentioned handle member.

2. In a griddle, a pair of similar griddle sections hinged together, a handle member for each of said sections, the axis of one of said handle members being in alinement with the top of the griddle and the other of said handle members surrounding a portion of and forming a bearing for the first mentioned handle member, and both of said handle members constituting a hinge for the griddle sections.

3. In a griddle, a pair of similar griddle sections hinged together, a handle member for each of said sections, the axis of one of said handle members being in alinement with the top of the griddle and the other of said handle members surrounding a portion of and forming a bearing for the first mentioned handle member, both of said handle members constituting a hinge for the griddle sections, and a hinge at the opposite end of said griddle sections, the center of the last named hinge being in alinement with the axis of the first named handle member.

4. In a griddle, the combination with a plurality of similar griddle sections, of an inner handle member secured to one of said sections at one end thereof, the axis of said handle member being in alinement with the top of the griddle sections, an outer tubular handle member secured to the other section, said tubular handle surrounding and forming a bearing for the first mentioned handle member, said tubular member being shorter than said inner handle member, and a hinge at the opposite end of said griddle sections, the center of said hinge being in alinement with the axis of said inner handle member.

5. In a griddle, a pair of similar griddle sections, each of said griddle sections having a downwardly extending peripheral flange and being provided with a peripheral bead, an inner cylindrical handle member having a laterally and downwardly bent flange, means for securing said flange to one of said griddle sections, an outer tubular handle member surrounding a portion of said inner handle member and constituting a bearing for the latter, said outer handle member having a downwardly and laterally bent flange, means for securing said last named flange to the other of said griddle sections, the axes of said handle members being in alinement with the top of said griddle sections, and a hinge at the opposite end of said griddle sections, the center of said hinge being coincident with the axis of said handle member.

6. In a griddle, a pair of similar griddle sections, each of said griddle sections having a downwardly extending peripheral flange and being provided with a peripheral bead, an inner cylindrical handle member having a laterally and downwardly bent flange, means for securing said flange to one of said griddle sections, an outer tubular handle member surrounding a portion of said inner handle member and constituting a bearing for the latter, said outer handle member having a downwardly and laterally bent flange, means for securing said last named flange to the other of said griddle sections, the axes of said handle members being in alinement with the top of said griddle sections, a hinge at the opposite end of said griddle sections, the center of said hinge being coincident with the axis of said handle member, and an auxiliary handle secured to the outer edge of one of said griddle sections.

THOMAS J. NASH.

Witnesses:
LEO J. SCHMITTEL,
C. W. MOSELEY.

Copies of this patent may be obtained for five cents each, by addressing the "Commissioner of Patents, Washington, D. C."